United States Patent
Badawy et al.

(10) Patent No.: US 10,578,059 B2
(45) Date of Patent: Mar. 3, 2020

(54) EXHAUST GAS RECIRCULATION SYSTEM LEAK DIAGNOSTICS USING UPSTREAM AND DOWNSTREAM OXYGEN SENSORS

(71) Applicants: Tamer Badawy, Dearborn Heights, MI (US); Kaustabh Pethe, Auburn Hills, MI (US); Lurun Zhong, Troy, MI (US)

(72) Inventors: Tamer Badawy, Dearborn Heights, MI (US); Kaustabh Pethe, Auburn Hills, MI (US); Lurun Zhong, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 78 days.

(21) Appl. No.: 15/962,609

(22) Filed: Apr. 25, 2018

(65) Prior Publication Data
US 2019/0331068 A1 Oct. 31, 2019

(51) Int. Cl.
*F02M 26/46* (2016.01)
*F02M 26/49* (2016.01)
*F01N 11/00* (2006.01)

(52) U.S. Cl.
CPC ........... *F02M 26/46* (2016.02); *F01N 11/007* (2013.01); *F02M 26/49* (2016.02); *F01N 2560/025* (2013.01); *F02M 2700/05* (2013.01)

(58) Field of Classification Search
CPC .... F02M 26/46; F02M 26/49; F02M 2700/05; F01N 11/007; F01N 13/008; F01N 2560/025
See application file for complete search history.

(56) References Cited

U.S. PATENT DOCUMENTS

| | | | |
|---|---|---|---|
| 7,715,976 B1 | 5/2010 | Xiao et al. | |
| 8,631,691 B2* | 1/2014 | Tanaka | F02D 41/0077 73/114.74 |
| 8,775,011 B2 | 7/2014 | Makki et al. | |
| 2002/0011066 A1 | 1/2002 | Takakura et al. | |
| 2011/0011378 A1* | 1/2011 | Nakamura | F02D 41/1495 123/568.16 |
| 2015/0007564 A1* | 1/2015 | Yoshioka | F02D 21/08 60/605.2 |
| 2018/0252609 A1* | 9/2018 | Neunteufl | G01M 3/025 |

* cited by examiner

*Primary Examiner* — Audrey K Bradley
(74) *Attorney, Agent, or Firm* — Ralph E Smith

(57) ABSTRACT

Diagnostic systems and methods for detecting leaks in an exhaust gas recirculation (EGR) system of an engine of a vehicle utilize an upstream oxygen (O2) sensor disposed in an exhaust system of the engine upstream from an EGR port of the EGR system and configured to measure an upstream O2 concentration of exhaust gas produced by the engine, a downstream O2 sensor disposed in the exhaust system downstream from the EGR port and configured to measure a downstream O2 concentration of the exhaust gas, and a controller configured to receive the measured upstream and downstream O2 concentrations from the upstream and downstream O2 sensors, respectively, and detect a leak in the EGR system when a difference between the measured downstream and upstream O2 concentrations exceeds a diagnostic threshold.

12 Claims, 2 Drawing Sheets

EXHAUST GAS RECIRCULATION SYSTEM LEAK DIAGNOSTICS USING UPSTREAM AND DOWNSTREAM OXYGEN SENSORS

FIELD

The present application generally relates to vehicle exhaust gas recirculation (EGR) systems and, more particularly, to diagnostic techniques for detecting leaks in an EGR system using upstream and downstream oxygen (O2) sensors.

BACKGROUND

An engine draws in air through an induction system and combusts a mixture of the air and fuel within cylinders to drive pistons and generate drive torque. Exhaust gas resulting from combustion is expelled from the cylinders into an exhaust system. An exhaust gas recirculation (EGR) system selectively recirculates a portion of the exhaust gas from the exhaust system to the induction system. Benefits of EGR include reduced nitrogen oxide (NOx) emissions, reduced pumping work, and the ability to operate the engine with dilution to air/fuel ratio. Conventional EGR systems utilize pressure sensors (e.g., an EGR valve delta pressure, or dP sensor) to identify an EGR flow direction, but these systems are unable to detect leaks in the EGR system. Undetected leaks in the EGR system could result in decreased performance and/or increased emissions due to the untreated exhaust gas being released into the atmosphere. Accordingly, while such EGR systems work for their intended purpose, there remains a need for improvement in the relevant art.

SUMMARY

According to one example aspect of the invention, a diagnostic system for detecting leaks in an exhaust gas recirculation (EGR) system of an engine of a vehicle is presented. In one exemplary implementation, the diagnostic system comprises: an upstream oxygen (O2) sensor disposed in an exhaust system of the engine upstream from an EGR port of the EGR system and configured to measure an upstream O2 concentration of exhaust gas produced by the engine; a downstream O2 sensor disposed in the exhaust system downstream from the EGR port and configured to measure a downstream O2 concentration of the exhaust gas; and a controller configured to: receive the measured upstream and downstream O2 concentrations from the upstream and downstream O2 sensors, respectively; and detect a leak in the EGR system when a difference between the measured downstream and upstream O2 concentrations exceeds a diagnostic threshold.

In some implementations, the detected leak in the EGR system causes EGR backflow that is measured by the downstream O2 sensor. In some implementations, the detected leak is in at least one of (i) an EGR duct connecting the EGR port to an induction system of the engine, (ii) an EGR cooler disposed along the EGR duct, and (iii) an EGR valve disposed along the EGR duct.

In some implementations, the upstream O2 sensor is a wide range O2 (WRO2) type sensor and the downstream O2 sensor is a switching or lambda type O2 sensor or a WRO2 type sensor. In some implementations, the upstream O2 sensor is disposed proximate to an outlet of an exhaust manifold of the exhaust system or an outlet of a turbine of a turbocharger of the engine and the downstream O2 sensor is disposed mid-bed in a catalytic converter of the exhaust system. In some implementations, the controller is further configured to adjust operation of the engine to prevent damage to the catalytic converter in the exhaust system.

According to another example aspect of the invention, a diagnostic method for detecting leaks in an EGR system of an engine of a vehicle is presented. In one exemplary implementation, the diagnostic method comprises: receiving, by a controller and from an upstream O2 sensor disposed in an exhaust system of the engine upstream from an EGR port of the EGR system, a measured upstream O2 concentration of exhaust gas produced by the engine; receiving, by the controller and from a downstream O2 sensor disposed in the exhaust system downstream from the EGR port, a measured downstream O2 concentration of the exhaust gas; and detecting, by the controller, a leak in the EGR system when a difference between the measured downstream and upstream O2 concentrations exceeds a diagnostic threshold.

In some implementations, the detected leak in the EGR system causes EGR backflow that is measured by the downstream O2 sensor. In some implementations, the detected leak is in at least one of (i) an EGR duct connecting the EGR port to an induction system of the engine, (ii) an EGR cooler disposed along the EGR duct, and (iii) an EGR valve disposed along the EGR duct.

In some implementations, the upstream O2 sensor is a WRO2 type sensor and the downstream O2 sensor is a switching or lambda type O2 sensor or a WRO2 type sensor. In some implementations, the upstream O2 sensor is disposed proximate to an outlet of an exhaust manifold of the exhaust system or an outlet of a turbine of a turbocharger of the engine and the downstream O2 sensor is disposed mid-bed in a catalytic converter of the exhaust system. In some implementations, the diagnostic method further comprises adjusting, by the controller, operation of the engine to prevent damage to the catalytic converter in the exhaust system.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As mentioned above, conventional exhaust gas recirculation (EGR) systems are unable to accurately detect malfunction leaks. Accordingly, diagnostic techniques are presented for detecting leaks in an EGR system using upstream and downstream oxygen (O2) sensors. These O2 sensors are disposed upstream/downstream with respect to an EGR port in the exhaust system. The techniques detect a leak malfunction of the EGR system based on a comparison between the measured upstream and downstream O2 concentrations. For example, a difference between the measured downstream and upstream O2 concentrations could be compared to a diagnostic threshold.

When the measured downstream O2 concentration is more than the diagnostic threshold difference higher than the measured upstream O2 sensor concentration, the leak malfunction is detected. This is because there is EGR backflow from the EGR system that is read by the downstream O2 sensor. In one exemplary implementation, the upstream O2 sensor is a wide-range O2 (WRO2) sensor disposed proximate to an outlet of an exhaust manifold or an outlet of a turbocharger turbine and the downstream O2 sensor is a switching or lambda type O2 sensor or a WRO2 sensor disposed mid-bed in a catalytic converter of the exhaust system. When the leak malfunction is detected, the system could alter engine operation to protect the catalytic converter.

Figure 1:
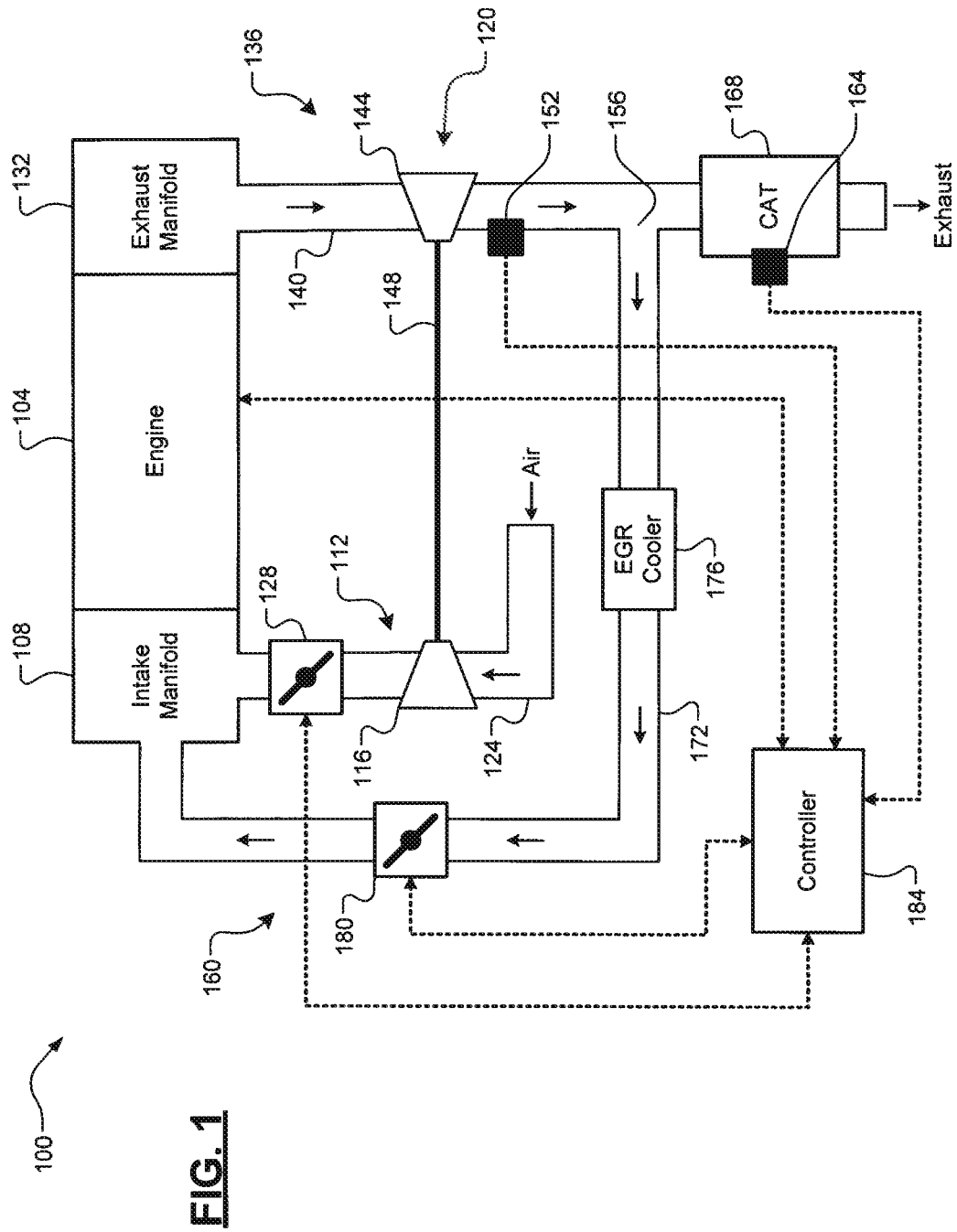
FIG. 1 is a diagram of an example vehicle having an engine with an exhaust gas recirculation (EGR) system according to the principles of the present disclosure.

Referring now to FIG. 1, an example vehicle 100 is illustrated. The vehicle 100 includes an engine 104 that draws air into an intake manifold 108 through an induction system 112. The induction system 112 comprises a compressor 116 of a turbocharger 120 that forces air through an induction passage 124 that is also regulated by a throttle valve 128. Note that the engine 104 does not need to be a turbocharged engine. The diagnostic techniques herein are applicable to any engine where intake manifold pressure exceeds exhaust gas pressure, which results in exhaust gas backflow when there is an EGR system leak. This includes turbocharged/supercharged engines with high-pressure EGR (HP-EGR) systems or mixed-loop EGR systems (low pressure pick-ups to high pressure feeds) as well as naturally aspirated (NA) engines (e.g., an NA engine operating at wide-open throttle (WOT) or an NA engine with an HP-EGR system. The air in the intake manifold 108 is distributed to a plurality of cylinders (not shown) and combined with fuel (e.g., gasoline) to form an air/fuel mixture. The air/fuel mixture is combusted within the cylinders to drive pistons (not shown) and generate drive torque.

Exhaust gas resulting from combustion is expelled from the cylinders into an exhaust manifold 132. The exhaust gas flows from the exhaust manifold 132 through an exhaust system 136. The exhaust system 136 comprises an exhaust passage 140 having a turbine 144 of the turbocharger 120 disposed there along. The exhaust gas drives the turbine 144, which in turn drives the compressor 116 via a shaft 148 of the turbocharger 120. An upstream O2 sensor 152 is configured to measure the O2 concentration of the exhaust gas at a point upstream from an EGR port 156 of an EGR system 160. In one exemplary implementation, the upstream O2 sensor 152 is a WRO2 sensor disposed proximate to an outlet of the exhaust manifold 132 or an outlet of the turbine 144. A downstream O2 sensor 164 is configured to measure the O2 concentration of the exhaust gas at a point downstream from the EGR port 156. In one exemplary implementation, the downstream O2 sensor 164 is a switching or lambda type O2 sensor that is disposed mid-bed in a catalytic converter (CAT, 168). It will be appreciated, however, that the downstream O2 sensor 164 could also be a WRO2 type sensor.

The EGR system 160 comprises an EGR passage or duct 172 that connects the EGR port 156 to a point in the induction system 112. As shown, the EGR system 160 could recirculate exhaust gas back into the intake manifold 108. It will be appreciated, however, that the EGR system 160 could recirculate the exhaust gas to any suitable point in the induction system 112, such as proximate to an inlet or outlet of the throttle valve 128 or upstream of the compressor 116. The EGR system 160 comprises an optional EGR cooler 176 and an EGR valve 180 each disposed along the EGR duct 172. A controller 184 controls operation of the engine 104, such as controlling air/fuel to achieve a desired torque. For example, the controller 184 could control the fueling to the engine 104 such that the exhaust gas remains at a stoichiometric air/fuel ratio (as measured by downstream O2 sensor 164). Such control benefits the operation of the catalytic converter 168 and prevents potential damage to the catalytic converter 168. Airflow control by the controller 184 could include, for example, controlling the throttle valve 128 and the EGR valve 180.

Figure 2:
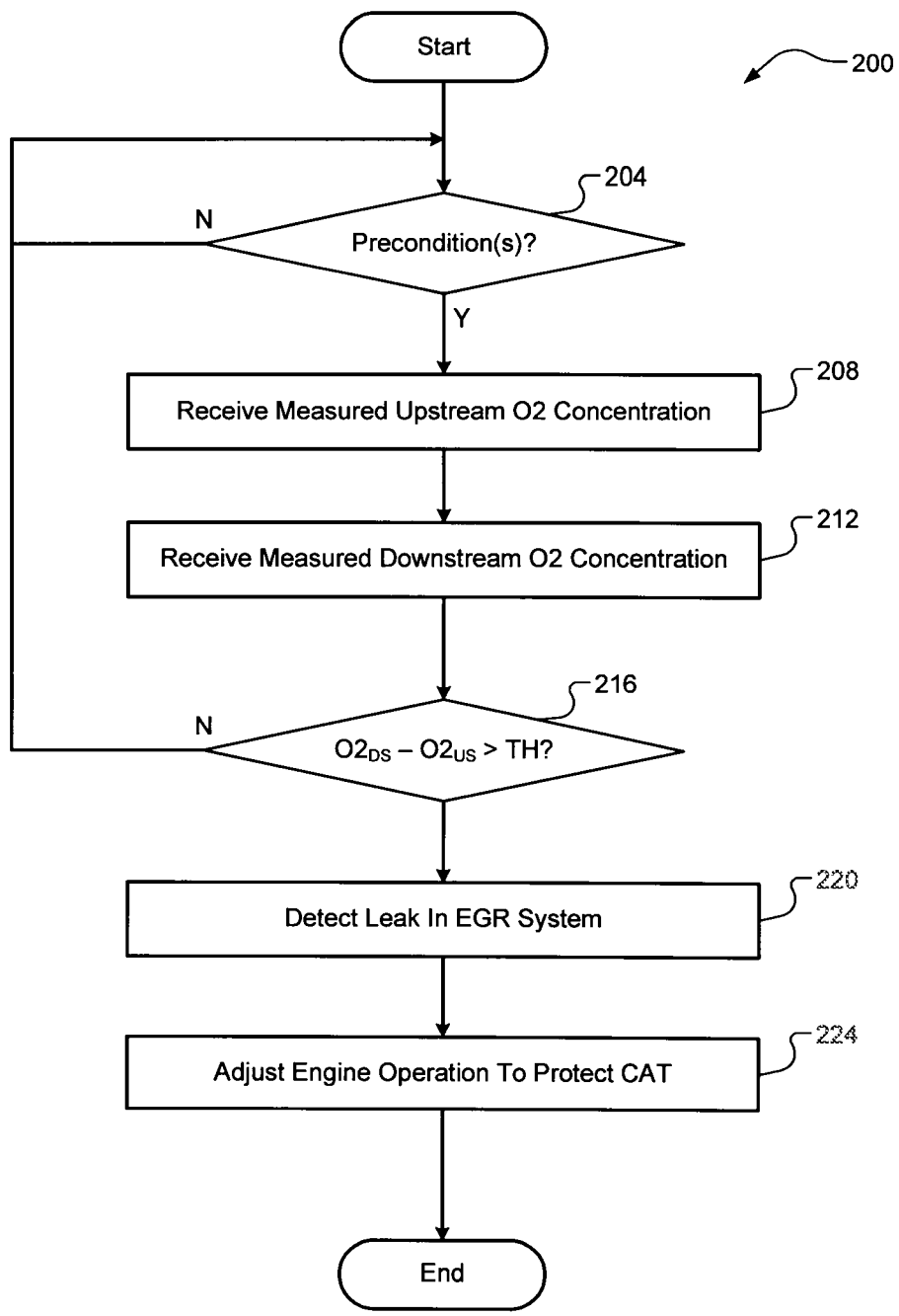
FIG. 2 is a flow diagram of an example diagnostic method for detecting leaks in an EGR system using upstream and downstream oxygen (O2) sensors according to the principles of the present disclosure.

Referring now to FIG. 2, a flow diagram of an example diagnostic method 200 for detecting leaks in the EGR system 160 using the upstream and downstream O2 sensors 152 and 164 is illustrated. At 204, the controller 184 determines whether a set of preconditions are satisfied. Each of these precondition(s) relates to whether or not it is appropriate to run the EGR system leakage diagnostic described herein. Non-limiting examples of these precondition(s) include the engine 104 is running, component speeds/temperatures are within desired thresholds, and no other component/circuit faults or malfunctions have been detected (e.g., the EGR valve 180 is stuck open/closed). When the set of preconditions are satisfied, the method 200 proceeds to 208. Otherwise, the method 200 ends or returns to 204. At 208, the controller 184 receives the measured upstream O2 concentration from the upstream O2 sensor 152. At 212, the controller 184 receives the measured downstream O2 concentration from the downstream O2 sensor 164.

At 216, the controller 184 determines whether a difference between the measured downstream O2 concentration ($O2_{DS}$) and the measured upstream O2 concentration ($O2_{US}$) exceeds a diagnostic threshold (TH). When true, the method 200 proceeds to 220. Otherwise, the method 200 ends or returns to 204. At 224, the controller 184 detects the leak malfunction of the EGR system 160. This could involve, for example, setting a leak malfunction fault or flag. It will be appreciated that the controller 184 could wait to detect multiple instances of the leak malfunction before taking any action such as setting the leak malfunction fault or flag. At optional 228, the controller 184 could also take further remedial action, such as adjusting engine operation to protect engine components like the catalytic converter (CAT, 168). For example, the controller 184 could control air/fuel to the engine 104 such that the air/fuel ratio of the exhaust gas remains stoichiometric. Additionally or alternatively, the controller 184 could disable the EGR system 160 and/or avoid operating ranges of the engine 104 where intake manifold pressure exceeds exhaust gas pressure. The method 200 then ends or returns to 204 for one or more additional cycles.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A diagnostic system for detecting leaks in an exhaust gas recirculation (EGR) system of an engine of a vehicle, the diagnostic system comprising:
   an upstream oxygen (O2) sensor disposed in an exhaust system of the engine upstream from an EGR port of the EGR system and configured to measure an upstream O2 concentration of exhaust gas produced by the engine;
   a downstream O2 sensor disposed in the exhaust system downstream from the EGR port and configured to measure a downstream O2 concentration of the exhaust gas; and
   a controller configured to:
      receive the measured upstream and downstream O2 concentrations from the upstream and downstream O2 sensors, respectively; and
      detect a leak in the EGR system when a difference between the measured downstream and upstream O2 concentrations exceeds a diagnostic threshold.

2. The diagnostic system of claim 1, wherein the detected leak in the EGR system causes EGR backflow that is measured by the downstream O2 sensor.

3. The diagnostic system of claim 2, wherein the detected leak is in at least one of (i) an EGR duct connecting the EGR port to an induction system of the engine, (ii) an EGR cooler disposed along the EGR duct, and (iii) an EGR valve disposed along the EGR duct.

4. The diagnostic system of claim 1, wherein the upstream O2 sensor is a wide range O2 (WRO2) sensor and the downstream O2 sensor is a switching or lambda O2 sensor or a WRO2 sensor.

5. The diagnostic system of claim 4, wherein the upstream O2 sensor is disposed proximate to an outlet of an exhaust manifold of the exhaust system or an outlet of a turbine of a turbocharger of the engine and the downstream O2 sensor is disposed mid-bed in a catalytic converter of the exhaust system.

6. The diagnostic system of claim 5, wherein the controller is further configured to adjust operation of the engine to prevent damage to the catalytic converter in the exhaust system.

7. A diagnostic method for detecting leaks in an exhaust gas recirculation (EGR) system of an engine of a vehicle, the diagnostic method comprising:
   receiving, by a controller and from an upstream oxygen (O2) sensor disposed in an exhaust system of the engine upstream from an EGR port of the EGR system, a measured upstream O2 concentration of exhaust gas produced by the engine;
   receiving, by the controller and from a downstream O2 sensor disposed in the exhaust system downstream from the EGR port, a measured downstream O2 concentration of the exhaust gas;
   detecting, by the controller, a leak in the EGR system when a difference between the measured downstream and upstream O2 concentrations exceeds a diagnostic threshold; and
   in response to detecting the leak in the EGR system, adjusting, by the controller, operation of the engine.

8. The diagnostic method of claim 7, wherein the detected leak in the EGR system causes EGR backflow that is measured by the downstream O2 sensor.

9. The diagnostic method of claim 8, wherein the detected leak is in at least one of (i) an EGR duct connecting the EGR port to an induction system of the engine, (ii) an EGR cooler disposed along the EGR duct, and (iii) an EGR valve disposed along the EGR duct.

10. The diagnostic method of claim 7, wherein the upstream O2 sensor is a wide range O2 (WRO2) sensor and the downstream O2 sensor is a switching or lambda O2 sensor or a WRO2 sensor.

11. The diagnostic method of claim 10, wherein the upstream O2 sensor is disposed proximate to an outlet of an exhaust manifold of the exhaust system or an outlet of a turbine of a turbocharger of the engine and the downstream O2 sensor is disposed mid-bed in a catalytic converter of the exhaust system.

12. The diagnostic method of claim 11, wherein adjusting operation of the engine in response to detecting the leak in the EGR system comprises adjusting, by the controller, operation of the engine to prevent damage to the catalytic converter in the exhaust system.

* * * * *